United States Patent
Denney et al.

(10) Patent No.: US 6,372,317 B1
(45) Date of Patent: Apr. 16, 2002

(54) BARRIER STRUCTURE FOR FOOD

(75) Inventors: Alan W. Denney, Clyde; Linnea Brady Keen, Canton, both of NC (US)

(73) Assignee: Blue Ridge Paper Products Inc., Waynesville, NC (US)

( * ) Notice: Subject to any disclaimer, the term of this patent is extended or adjusted under 35 U.S.C. 154(b) by 0 days.

(21) Appl. No.: 09/451,063

(22) Filed: Nov. 30, 1999

(51) Int. Cl.⁷ .................................................. B27N 1/08
(52) U.S. Cl. .................. 428/34.2; 428/36.7; 428/475.8; 428/479.3; 428/513; 428/511; 428/515; 428/516
(58) Field of Search ................................ 428/36.7, 34.2, 428/475.8, 479.3, 513, 511, 515, 516

(56) References Cited

U.S. PATENT DOCUMENTS

| | | | |
|---|---|---|---|
| 4,698,246 A | 10/1987 | Gibbons et al. | 428/34.2 |
| 4,701,360 A | 10/1987 | Gibbons et al. | 428/34.2 |
| 4,753,832 A * | 6/1988 | Brown | 428/35 |
| 4,777,088 A * | 10/1988 | Thompson | 428/323 |
| 4,789,575 A | 12/1988 | Gibbons et al. | 428/34.2 |
| 4,806,399 A | 2/1989 | Gibbons et al. | 428/34.2 |
| 4,950,510 A | 8/1990 | Massouda | 428/34.2 |
| 4,977,004 A | 12/1990 | Bettle, III et al. | 428/36.7 |
| 5,712,006 A * | 1/1998 | Marano | 428/34.2 |
| 6,114,456 A * | 9/2000 | Dewart | 525/240 |

* cited by examiner

Primary Examiner—Leszek Kiliman
(74) Attorney, Agent, or Firm—Dority & Manning, PA

(57) ABSTRACT

A barrier laminate useful for the formation of orange juice and citrus beverage cartons is provided. The laminate provides a skin coat of a MDPE which provides a barrier to water vapor transmission through the laminate. The reduced water vapor flow decreases the bulge rate of the resulting carton.

10 Claims, 2 Drawing Sheets

BARRIER STRUCTURE FOR FOOD

BACKGROUND OF THE INVENTION

The present invention relates to a barrier structure for food packages which is useful for providing an extended package and product shelf life. The barrier structure of the present invention may be used in a variety of packages, including paper cartons. The barrier structure for the food package of the present invention is heat sealable, thus providing a useful barrier structure for converting a stock material into cartons and similar food retaining packages which require heat sealing. The barrier structure of the present invention is particularly useful in packaging orange juice and similar citrus products.

With respect to juice containers, fruit juice manufacturers and packaging suppliers must address a variety of performance considerations in order to provide a cost effective container which meets the needs of multiple performance characteristics. In recent years, there has been much attention focused on providing oxygen barriers for the container to avoid the oxidation of flavoring components found in the juice along with the oxidation loss of L-ascorbic acid (vitamin C). As various packaging innovations have been developed which lead to the improved retention of nutrients and taste, the packaging shelf life has correspondingly been increased. As a result, as the useful packaging shelf life has increased, the durability and longevity of the packaging has become an increased issue.

One aspect of shelf life with regard to paperboard containers as are commonly used for milk, orange juice, and similar products involves the tendency of the carton structure to distort or bulge over time. The carton bulge is unsightly and may be mistakenly perceived by consumers as indicative of an expired or spoiled product.

Heretofore, it was widely held that the bulge properties of cartons were best controlled by increasing the thickness or stiffness of the underlying paperboard substrate. In accordance with the present invention, it has been found by applicants that by reducing the moisture transmission rate, particularly moisture passing through the interior surface of a sealed carton, offers significant improvements in the bulge properties of the carton. Further, it is possible to provide a carton having a highly effective oxygen barrier layer which, in combination with the water vapor barrier, provides a cost effective desirable carton for use with juice, citrus products, milk, and other high liquid content food products.

A variety of barrier structures and food packages are known within the art.

For instance, U.S. Pat. No. 4,753,832 is directed to a barrier laminate suitable for citrus beverages which has an innermost beverage contacting surface comprising a thin layer of glycol-modified polyethylene terephthalate (PET-G) which provides improved oxygen barrier properties as opposed to an uncoated substrate.

U.S. Pat. No. 4,513,036, which is incorporated herein by reference, discloses a barrier laminate applied to a paperboard substrate comprising a web of propylene polymer adjacent to a food contact layer of an olefin polymer. An outer surface of the paperboard substrate is coated with a layer of a heat sealable olefin polymer. The structure sets forth a laminate having improved properties in retaining d-limonene along with improved retention of vitamin C levels.

U.S. Pat. No. 4,977,004, incorporated herein by reference, discloses a barrier liner for food packages comprising twin layers of ethylene-vinyl alcohol copolymers (EVOH). One layer is interposed between two moisture barriers such as high density polyethylene (HDPE), EVOH compatible adhesives, or low density polyethylene (LDPE). The innermost layer of EVOH provides a solvent barrier against loss of flavor components while the second EVOH layer serves as an oxygen barrier.

While there are a variety of barrier laminates directed to imparting protective properties for preventing loss of flavoring components, vitamin C, and barriers to reduce oxygen transmission through the laminate, there remains room for variation and improvement within the art.

SUMMARY OF THE INVENTION

The present invention provides a barrier structure suitable for converting into packages for foods and beverages which are economical, have good heat-sealing properties, exhibit low oxygen and water vapor permeability, and provide protection against carton bulge or creep.

In its broadest embodiment, the barrier structure of the present invention comprises a food contact layer or "skin coat" of a medium density polyethylene (MDPE) in which the MDPE is attached by an adhesive tie layer to a polyamide barrier layer. The polyamide barrier layer is attached directly along one surface to an inner paperboard surface. The polyamide layer and adjacent tie layer offer useful oxygen and water vapor barriers respectively. The MDPE skin coat provides an additional water vapor barrier and which further provides an essential oil barrier which reduces scalping, i.e., the absorption of d-limonene by the interior board coating.

These and other features, aspects, and advantages of the present invention will become better understood with reference to the following description and appended claims.

BRIEF DESCRIPTION OF THE DRAWINGS

A full and enabling disclosure of the present invention, including the best mode thereof, to one of ordinary skill in the art, is set forth more particularly in the remainder of the specification, including reference to the accompanying drawings.

DETAILED DESCRIPTION OF THE PREFERRED EMBODIMENT

Reference now will be made in detail to the embodiments of the invention, one or more examples of which are set forth below. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment, can be used on another embodiment to yield a still further embodiment. Thus, it is intended that the present invention cover such modifications and variations as come within the scope of the appended claims and their equivalents. Other objects, features, and aspects of the present invention are disclosed in, or are obvious from, the following detailed description. It is to be understood by one of ordinary skill in the art that the present discussion is a description of exemplary embodiments only and is not intended as limiting the broader aspects of the present invention, which broader aspects are embodied in the exemplary constructions.

As used herein, the terms "inner" and "outer" are used to describe and clarify relative positions of various layers of the resulting laminate. "Inner" refers to a position or layer along the carton interior. The term "skin coat" refers to the innermost layer of the laminate/carton and provides the food contact surface. Similarly, "outer" is used to indicate a layer or surface closest to the gloss or exterior surface of the laminate/carton.

As used herein, MDPE refers to a polyethylene having an average density level ranging from about 0.926 to about 0.940. The MDPE is prepared by mixing 55 percent by weight of an LDPE with 45 percent by weight of an HDPE. The resulting mixture is thereafter extruded as a single layer of MDPE. The resulting MDPE has an overall greater density than the LDPE materials which have been conventionally used in the formulation of barrier layers. The higher density values of the MDPE imparts improved water vapor barrier properties while maintaining an inner surface which can be readily heat sealed using conventional methods and equipment.

Figure 1:
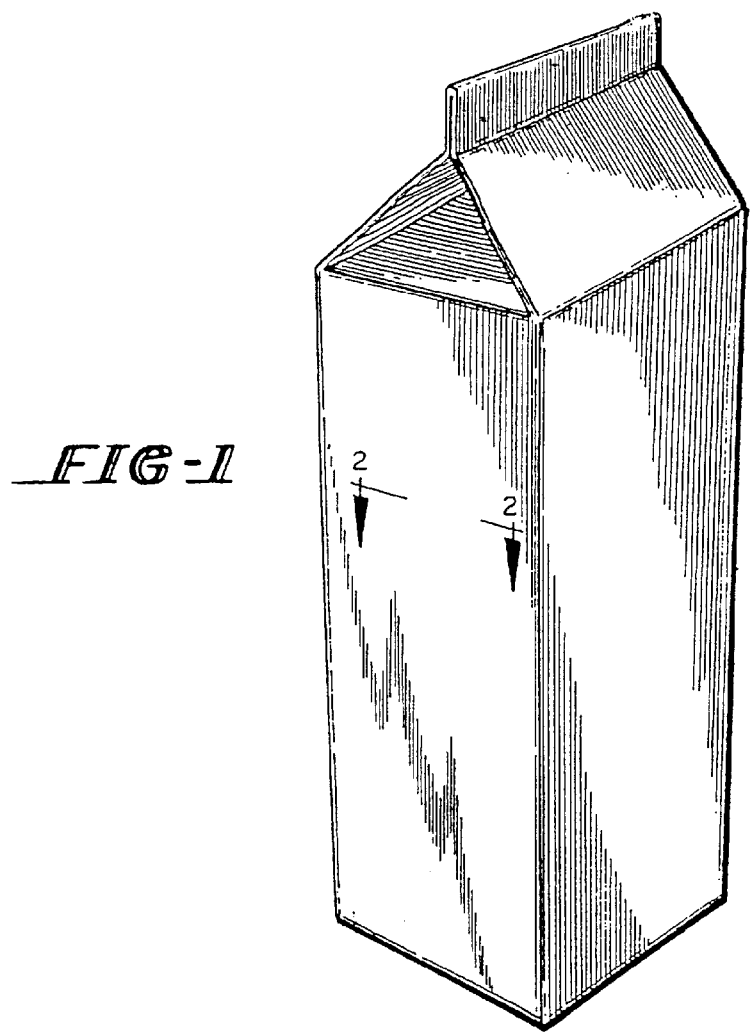
FIG. 1 is a perspective view of a juice carton in accordance with the present invention.
Figure 2:
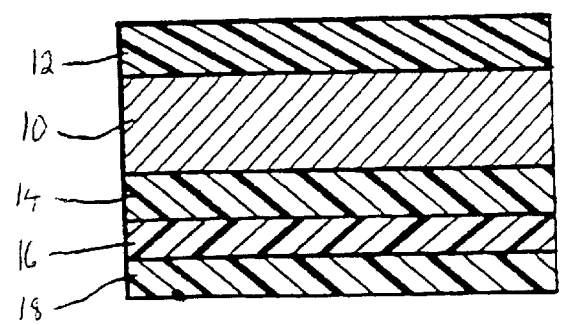
FIG. 2 is a cross section taken along line 2—2 of FIG. 1 setting forth a laminate board structure of the present invention.

It has been discovered that a barrier laminate suitable for food and beverage barrier structures can be provided by a paperboard embodying the barrier structure as illustrated in FIGS. 1 and 2. As seen in FIG. 2, the paperboard used in the finished carton of FIG. 1 comprises a fiber layer 10 which is sandwiched between an extruded MDPE layer 12, forming an exterior gloss surface, and an extruded inner polyamide layer 14. As best seen in FIG. 2, the polyamide layer 14 is attached directly to the inner board surface 10. An adhesive tie layer 16 joins the inner surface of nylon layer 16 the adjacent skin layer of MDPE.

The preferred board structure can be provided by any conventional "juice board" or "milk board" which is a paper fiber board having conventional sizing agents added to provide enhanced wet strength. Generally, board structure varies from about 150 to about 320 pounds per 3,000 square feet though paperboard having greater or lesser weights could be used for various applications. One having ordinary skill in the art will appreciate that the primary function of the paperboard is to provide an overall structurally sound and rigid package.

As seen in FIGS. 1 and 2, the paperboard 10 is laminated between an outer extruded layer of MDPE 12 and an inner surface layer 14 of polyamide. The gloss, exterior surface of the MDPE layer 12 is applied at about 16 pounds per 3,000 square feet of board and provides for a resulting package having good external moisture barrier properties, high gloss, and an abuse resistant impact surface. The inner polyamide (nylon) layer 14 is applied directly to the board 10 at a coating level of about 3–5 pounds per 3,000 square feet and more preferably at about 5 pounds per 3,000 square feet. Applying the nylon layer 14 directly to the board 10 provides for good oxygen barrier properties.

Adjacent the inner nylon surface layer 14 is a tie layer 16, preferably provided by a modified polyethylene resin such as Bynel E 388™ or Flexar 175 (Equistar), which is applied in a range of about 3 to about 5 pounds per 3,000 square feet of board. The tie layer 16 is used to adhere the inner nylon surface layer to the adjacent MDPE skin coat layer 18. The MDPE skin layer 18 is applied at a rate of about 20 pounds per 3,000 square feet of board. The MDPE skin layer provides the inner laminate food contact surface. In accordance with this invention the MDPE provides useful properties as a barrier against water vapor transmission. Further, the MDPE skin layer has also been found to minimize the absorption/migration of an essential citrus flavoring oil, d-limonene, when compared to lower density polyethylene skin layers. Further, the MDPE skin layer possesses good heat sealing properties and provides a workable finish for the subsequent handling and converting of the laminated board stock into erect, fillable cartons.

The structure seen in FIGS. 1 and 2 and as discussed above, is easily applied to board stock through conventional extruding techniques and equipment. The resulting structure has been found to offer a useful barrier structure for orange juice and related products in that the filled and sealed cartons exhibit low oxygen transmission rates, has good resistance to water transmission, has increased resistance to creep of bulge of the carton, possesses good resistance to scalping of d-limonene, and maintains effective levels of L-ascorbic acid (vitamin C).

COMPARATIVE EXAMPLE 1

To illustrate the properties of the laminate and carton described above, comparative studies of a carton made according to the present invention ("trial examples") were compared to a standard structure as constructed according to the teachings of U.S. Pat. No. 4,835,025, which is incorporated herein by reference. The standard carton has a configuration of:

16# LDPE/280# board/5# nylon/5# tie/16# LDPE The trial structure according to the present invention is constructed of:

16# MDPE/280# board/5# nylon/5# tie/20# MDPE

Standard ½ gallon containers were constructed from the standard and trial board stock set forth above. The containers were evaluated for oxygen transmission rates according to ASTM method D-3985 in which penetrating oxygen levels are determined for container samples containing a nitrogen gas.

The control board and the trial board were further evaluated for water vapor transmission using TAPPI T-557 (PM-951) which corresponds to ASTM Standard F1249-90. The test measures the partial pressure concentration of water vapor which permeates through the barrier from the wet side to the dry side of the laminate. Measurements were made using MOCON Permatran equipment.

The oxygen transmission values of the trial board are equal to or better than the values of the commercially available control board. The trial board had an average oxygen transmission value of $4.85\pm0.1$ $cc/m^2/day$ compared to the values from the control board stock of $5.0\pm0.1$ $cc/m^2/day$.

Consistent with the higher density of the MDPE, the trial board data indicated an approximate 7 percent reduction in the water vapor transmission rate compared to the control board. As discussed below, the improvement in water transmission rate is believed to correlate with the improved resistance to bulge properties of containers constructed according to the present invention.

Bulge Test Data

The control and trial barrier structures were also evaluated for bulge resistance. A series of individual one-half gallon cartons of control and trial barrier boards were separately filled with orange juice and a fruit punch product and monitored over a twelve-week period in a refrigerated cold room. Weekly measurements were made using calipers for each filled carton's length and width which, for the rectangular cartons, are of substantially equal lengths. The average (mean) values for each sample carton over the twelve week time period are illustrated graphically in FIG. 3. The orange juice control (A) and fruit punch control carton (B) have a bulge increase of 0.269 and 0.206 inches respectively over the twelve-week evaluation interval. The trial containers had a bulge increase of 0.119 inches and 0.133 inches for the respective orange juice and fruit punch containers. As best illustrated in the graph set forth as FIG. 3, the trial cartons demonstrated less bulge than the control cartons.

The MDPE barrier layer provides an excellent water vapor barrier when compared to lower density polyethylene (LDPE) which is frequently used as a barrier material within conventional juice and beverage cartons. While conventional teachings suggest that bulge improvements are obtained by increasing the stiffness of the underlying board, the present invention establishes that significant improvements in carton bulge can be obtained by the establishment of an improved moisture resistant barrier between the board and the interior wet surface of the container. Thus, by decreasing the passage of water vapor through the laminate structure, improvement in the bulge resistance properties of the carton can be obtained.

Figure 3:
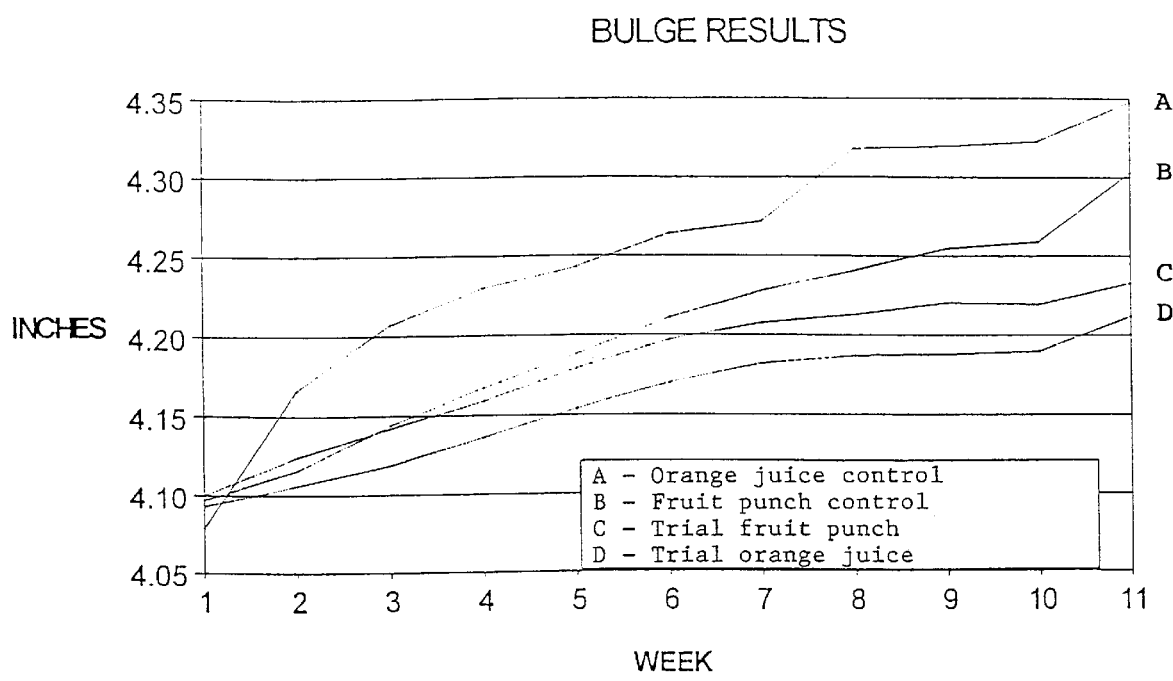
FIG. 3 is a graph depicting the increase in carton bulge properties over time of control stock cartons and trial cartons containing orange juice and fruit juice products.

As seen in reference to the FIG. 3 graph, the improvement in bulge resistance in the trial board becomes more pronounced over time. While not wishing to be limited by theory, it is believed that even modest improvements in water vapor transmission rates may increase the bulge resistance of the resulting carton. The tendency of cartons to bulge appears to be a cumulative phenomenon which correlates with the volume of water vapor transmission over time. Accordingly, the modest reduction in water vapor transmission rate through the paperboard results in improved bulge resistance of the carton, the improvement becoming more pronounced as time elapses.

The present invention recognizes that the average density of the polyethylene barrier layer can be increased over the LDPE ranges used within the prior art. The increased density achieves a barrier layer having improved resistance to water vapor transmission. Further, the MDPE maintains the useful ability to be heat sealed during commercial packaging operations.

While not separately set forth, evaluations of the trial structures for retention of vitamin C levels and d-limonene levels fall within the typical and useful commercial ranges associated with conventional paperboard containers for orange juice and beverage products. Further, the improved barrier properties and the resulting carton can be used in conjunction with additional layers and laminates to provide additional variation in useful laminates.

Although preferred embodiments of the invention have been described using specific terms, devices, and methods, such description is for illustrative purposes only. The words used are words of description rather than of limitation. It is to be understood that changes and variations may be made by those of ordinary skill in the art without departing from the spirit or the scope of the present invention, which is set forth in the following claims. In addition, it should be understood that aspects of the various embodiments may be interchanged, both in whole or in part. Therefore, the spirit and scope of the appended claims should not be limited to the description of the preferred versions contained therein.

That which is claimed is:

1. A barrier laminate comprising:
    a paperboard substrate having a first surface and a second surface, the second surface being opposite the first surface;
    a nylon barrier layer having an inner surface and an outer surface, said nylon outer surface applied directly on the first surface of the paperboard substrate;
    a tie layer having an inner surface and an outer surface, said outer surface of the tie layer applied to an inner surface of the nylon barrier layer; and,
    a medium density polyethylene barrier layer applied directly onto an inner surface of the tie layer, the medium density polyethylene barrier layer further providing a heat seal layer.

2. The barrier laminate according to claim 1 wherein the medium density polyethylene has an average density of between about 0.926 and about 0.940.

3. The barrier laminate according to claim 2 wherein the MDPE is applied to the paperboard substrate at coating weight of between about 3–5 pounds per 3000 square feet.

4. The barrier laminate according to claim 1 further comprising a second layer of MDPE applied to the second surface of the paperboard substrate.

5. A foldable laminated blank comprising:
    a substrate material selected from the group consisting of paper, paperboard, fiberboard, and bleached kraft paper having a first side and a second side opposite the first side;
    a nylon barrier layer having an inner surface and an outer surface, said outer surface attached directly to the first side of the substrate material; and,
    a product contacting surface opposite an inner surface of the nylon barrier layer, said product contacting surface comprised substantially entirely of a layer of MDPE, the layer of MDPE providing a heat sealable barrier.

6. The barrier laminate according to claim 5 further comprising a tie layer connecting the inner nylon barrier layer surface to an outer surface of the MDPE product contacting layer.

7. The barrier laminate according to claim 5 wherein the medium density polyethylene barrier layer has an average density of between about 0.926 and about 0.940.

8. The barrier laminate according to claim 6 wherein the MDPE is applied at a coating weight of between about 3–5 pounds per 3000 square feet.

9. The barrier laminate according to claim 5 further comprising a second layer of MDPE applied to the second surface of the substrate.

10. A foldable laminated blank comprising:
    a substrate material selected from the group consisting of paper, paperboard, fiberboard, and bleached kraft paper having a first side and a second side opposite the first side;
    a nylon barrier layer having an inner surface and an outer surface, said outer surface attached directly to the first side of the substrate material;
    a product contacting surface opposite an inner surface of the nylon barrier layer, said product contacting surface comprised substantially entirely of a layer of MDPE, the layer of MDPE providing a heat sealable barrier;
    wherein when said foldable laminated blank is configured into a carton, said carton is resistant to bulge.

* * * * *